United States Patent
Pal

(10) Patent No.: US 9,319,222 B2
(45) Date of Patent: Apr. 19, 2016

(54) TWO FACTOR AUTHENTICATION OF ICR TRANSPORT AND PAYLOAD FOR INTERCHASSIS REDUNDANCY

(71) Applicant: Telefonaktiebolaget L M Ericsson (publ), Stockholm (SE)

(72) Inventor: Yogendra Pal, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 17 days.

(21) Appl. No.: 14/247,518

(22) Filed: Apr. 8, 2014

(65) Prior Publication Data

US 2015/0288690 A1    Oct. 8, 2015

(51) Int. Cl.
| | |
|---|---|
| G06F 21/64 | (2013.01) |
| H04L 9/32 | (2006.01) |
| H04L 29/06 | (2006.01) |

(52) U.S. Cl.
CPC .............. H04L 9/3242 (2013.01); G06F 21/64 (2013.01); H04L 63/08 (2013.01); H04L 63/12 (2013.01); H04L 63/123 (2013.01)

(58) Field of Classification Search
CPC ....................................................... H04L 63/12
See application file for complete search history.

(56) References Cited

U.S. PATENT DOCUMENTS

| | | | | |
|---|---|---|---|---|
| 6,643,287 | B1 * | 11/2003 | Callon et al. | 370/392 |
| 7,269,186 | B2 * | 9/2007 | Abrol et al. | 370/476 |
| 8,281,218 | B1 * | 10/2012 | Ybarra et al. | 714/763 |
| 2002/0188849 | A1 * | 12/2002 | Kwan | G06F 21/64 713/176 |
| 2004/0092310 | A1 * | 5/2004 | Brosnan | G06F 21/606 463/42 |
| 2007/0283158 | A1 * | 12/2007 | Danseglio | 713/180 |
| 2011/0299685 | A1 * | 12/2011 | Hall | 380/273 |
| 2013/0185767 | A1 * | 7/2013 | Tirupachur Comerica et al. | 726/4 |

OTHER PUBLICATIONS

Liu et al., "RFC 7309: Redundancy Mechanism for Inter-domain VPLS Service", Jul. 2014, 12 pages.*
Kaufman, C., "Internet Key Exchange (IKEv2) Protocol", Network Working Group, Request for Comments: 4306, The Internet Society, (Dec. 2005), 99 pages.
Kent, et al., "IP Authentication Header", Network Working Group, Request for Comments: 2402, The Internet Society, (Nov. 1998), 22 pages.

(Continued)

Primary Examiner — Taghi Arani
Assistant Examiner — Thaddeus Plecha
(74) Attorney, Agent, or Firm — Nicholson De Vos Webster & Elliott LLP

(57) ABSTRACT

Exemplary methods for performing authentication by a first network device of an inter-chassis redundancy (ICR) system, the ICR system comprising the first network device communicatively coupled to a second network device of the ICR system, includes in response to determining to transmit an ICR message to the second network device, generating the ICR message by generating a first and second authentication digest. In one embodiment, the methods include encrypting a payload of the ICR message, and transmitting the ICR message that includes the first and second authentication digest to the second network device. In another aspect of the invention, the methods include receiving an ICR message from the second network device and performing a first level authentication of the received ICR message. The methods further include in response to determining the first level authentication is successful, performing a second level authentication of the received ICR message.

33 Claims, 13 Drawing Sheets

(56) References Cited

OTHER PUBLICATIONS

Kent, et al., "IP Encapsulating Security Payload (ESP)", *Network Working Group, Request for Comments: 2406, The Internet Society*, (Nov. 1998), 22 pages.

Kent, et al., "Security Architecture for the Internet Protocol", *Network Working Group; Request for Comments: 2401 (RFC2401)*, (Nov. 1998), 66 pages.

\* cited by examiner

Electronic Codebook (ECB) mode encryption

Electronic Codebook (ECB) mode decryption

TWO FACTOR AUTHENTICATION OF ICR TRANSPORT AND PAYLOAD FOR INTERCHASSIS REDUNDANCY

FIELD

Embodiments of the invention relate to the field of packet networks; and more specifically, to authentication of interchassis redundancy (ICR) messages.

BACKGROUND

In communication networks, it is generally desirable to prevent service outages and/or loss of network traffic. By way of example, such service outages and/or loss of network traffic may occur when a network device fails, loses power, is taken offline, is rebooted, a communication link to the network device breaks, etc.

In order to prevent such service outages and/or loss of network traffic, the communication networks may utilize inter-chassis redundancy (ICR). In an ICR system, there are typically two ICR devices (i.e., nodes). During normal operation, one ICR device is configured to be in active state while the other is configured to be in standby state. The active ICR device is responsible for handling network traffic with a plurality other network devices, including, for example, allocating Internet Protocol (IP) addresses to such other network devices.

When the active ICR device fails, a switchover occurs. As used herein, a switchover refers to the ICR devices switching roles. For example, the active ICR device becomes the standby ICR device, and the standby ICR device takes over the role of being an active ICR device. In order for the switchover to occur seamlessly, the ICR devices must continuously stay in sync with each other by transmitting state information among the ICR devices. The state information are transmitted as part ICR messages over a transport channel. Conventionally, the ICR messages are sent in clear text. In cases where the ICR devices are geographically dispersed, the ICR messages are susceptible to being compromised.

SUMMARY

Techniques for enabling a two level authentication of ICR messages by a first network device of an ICR system, the ICR system comprising the first network device communicatively coupled to a second network device of the ICR system, are herein described. In one aspect of the invention, the first network device, in response to determining to transmit an ICR message to the second network device, generates the ICR message by generating a second authentication digest, wherein the second authentication digest is used by the second network device to perform a second level authentication of the ICR message. In one embodiment, the first network device generates the ICR message by further generating a first authentication digest, wherein the first authentication digest is used by the second network device to perform a first level authentication of the ICR message. In one embodiment, the first network device includes the first authentication digest and the second authentication digest in the ICR message, and transmits the ICR message to the second network device.

According to one embodiment, the first network device generates the second authentication digest by applying a hash-based message authentication code (HMAC) function to a key, an application header included in the ICR message, and application data included in the ICR message. In one embodiment, the first network device generates the first authentication digest by applying the HMAC function to a key and the second authentication digest. In an alternate embodiment, the first network device generates the first authentication digest by applying the HMAC function to a key, an Internet Protocol (IP) header included in the ICR message, and a common header included in the ICR message. In one embodiment, the first authentication digest and the second authentication digest are contiguously located in the ICR message. In one embodiment, the first authentication digest and the second authentication digest are different in size. In one embodiment, the first network device encrypts the application data of the ICR message prior to transmitting the ICR message to the second network device.

Techniques for performing a two level authentication of ICR messages by a first network device of an ICR system, the ICR system comprising the first network device communicatively coupled to a second network device of the ICR system, are herein described. In one embodiment, the first network device receives an ICR message from the second network device and performs a first level authentication of the received ICR message based on a first authentication digest included in the received ICR message. In one embodiment, in response to determining the first level authentication is successful, the first network device performs a second level authentication of the received ICR message based on a second authentication digest included in the received ICR message.

In one embodiment, the first network device performs the first level authentication of the received ICR message by generating a first authentication digest by applying a hash-based message authentication code (HMAC) function to a key and the second authentication digest included in the received ICR message, and comparing the generated first authentication digest against a first authentication digest included in the received ICR message, wherein the first level authentication of the ICR message is successful if the generated first authentication digest matches the first authentication digest included in the received ICR message.

In an alternate embodiment, the first network device performs the first level authentication of the received ICR message by generating a first authentication digest by applying the HMAC function to a key, an Internet Protocol (IP) header included in the received ICR message, and a common header included in the received ICR message, and comparing the generated first authentication digest against the first authentication digest included in the received ICR message, wherein the first level authentication of the ICR message is successful if the generated first authentication digest matches the first authentication digest included in the received ICR message.

In one embodiment, the first network device performs the second level authentication of the received ICR message by generating a second authentication digest by applying a HMAC function to a key, an application header included in the received ICR message, and application data included in the received ICR message, and comparing the generated second authentication digest against the second authentication digest included in the received ICR message, wherein the second level authentication of the ICR message is successful if the generated second authentication digest matches the second authentication digest included in the received ICR message. In one embodiment, the first network device performs the first and second level authentication in a distributed manner. In one embodiment, the first network device decrypts the application data included in the received ICR message.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Figure 1:
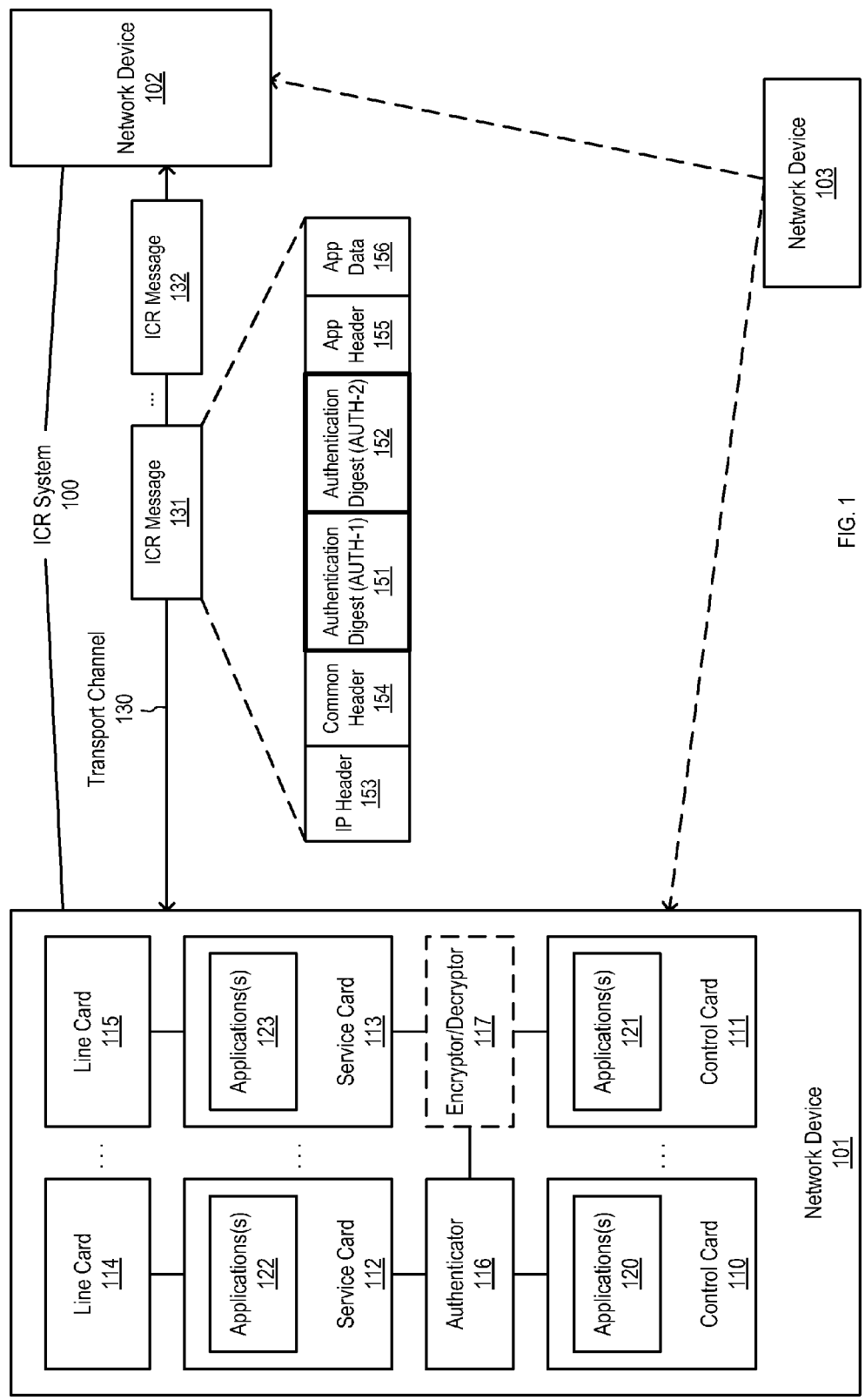
FIG. 1 is a block diagram illustrating an inter-chassis redundancy (ICR) system according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP)) that communicate with other network devices to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network device can store one or more bridging tables that are used to forward data based on the layer 2 information in that data.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP), Transmission Control Protocol (TCP), and differentiated services (DSCP) values. Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Techniques for performing a two-level authentication of ICR messages are described herein. According to one aspect of the invention, an ICR system comprises a first network device and a second network device. In response to determining to transmit an ICR message to the second network device, an application associated with a first network device generates an application header and application data corresponding to the ICR message. In one embodiment, the application generates an authentication digest based on a key, the application header, and application data. The authentication digest may be utilized by the second network device to perform a second level authentication of the ICR message. In one embodiment, the application is configured to encrypt the application data. In such an embodiment, the application encrypts the application data prior to generating the authentication digest.

In one embodiment, in response to receiving the application header, (encrypted) application data, and authentication digest from the application, an authenticator associated with the first network device generates an IP header and common header corresponding to the ICR message. In one embodiment, the authenticator generates an authentication digest based on a key and the authentication digest generated by the application. In an alternate embodiment, the authenticator generates the authentication digest based on a key, the IP header, and the common header. In such an embodiment, the authenticator generates the authentication digest by zeroing out the TTL of a local copy of the IP header. The TTL of the IP header that is transmitted to the second network device remains unmodified. The authentication digest generated by the authenticator may be utilized by the second network device to perform a first level authentication of the ICR message.

In one embodiment, in response to receiving the ICR message from the authenticator, a line card associated with the first network device transmits the ICR message to the second network device. In one embodiment, the transmitted ICR message includes the IP header, the common header, the authentication digests, the application header, and the application data.

According to one aspect of the invention, in response to receiving an ICR message from the second network device intended for an application associated with the first network device, a line card associated with the first network device sends to received ICR message to the authenticator for a first level authentication. In one embodiment, the received ICR message includes an IP header, a common header, a first authentication digest, a second authentication digest, an application header, and application data (which may or may not be encrypted).

In one embodiment, in response to receiving the ICR message from the line card, the authenticator generates an authentication digest based on the second authentication digest included in the received ICR message. In an alternate embodiment, the authenticator generates an authentication digest based on the IP header and common header included in the received ICR message. In such an embodiment, the authenticator zeroes out the TTL of the IP header prior to generating the authentication digest. The IP header that is sent to the intended application, however, remains unmodified. In one embodiment, the authenticator performs a first level authentication of the received ICR message by comparing the generated authentication digest against the first authentication digest included in the received ICR message. According to one embodiment, the first level authentication is determined to be successful if the generated authentication digest matches the received first authentication digest (or differ within a predetermined tolerable margin).

In response to determining the first level authentication is successful, the authenticator sends the received ICR message to the intended application (again, with the IP header unmodified). In response to receiving the ICR message, the application generates an authentication digest, according to one embodiment, based on the application header and application data included in the received ICR message. In one embodiment, the application performs a second level authentication of the received ICR message by comparing the generated authentication digest against the second authentication digest included in the received ICR message. In one embodiment, the second level authentication is determined to be successful if the generated authentication digest matches the second authentication digest included in the received ICR message (or differ within a predetermined tolerable margin). In response to determining the second level authentication is successful, the application processes the ICR message based on the received application header and data. According to one embodiment, the received application data is encrypted. In such an embodiment, the application decrypts the application data prior to processing.

FIG. 1 is a block diagram illustrating ICR system 100 according to one embodiment. ICR system 100 includes network devices 101-102. For example, network device 101 may serve as an active ICR device, while network device 102 serves as the standby ICR device, or vice versa. Throughout the description, embodiments of the present invention are described with reference to ICR system 100 having two network devices. It shall be understood, however, that the present invention is not so limited, and can be extended to an ICR system having three or more ICR devices.

According to one embodiment, network device 101 includes line cards 114-115. Line cards 114-115 include network interfaces (not shown) for exchanging messages/packets with external network devices (e.g., network devices 102-103). Line cards 114-115 also include processing logic for receiving and forwarding traffic (e.g., to control cards 110-111, and/or service cards 112-113). Line cards 114-115 may also include one or more memories to store a forwarding information base (sometimes referred to as a routing table) and a label forwarding information base.

In one embodiment, network device 101 includes service cards 112-113. Service cards 112-113 include one or more processors to execute instructions stored in memory for performing/hosting applications 122-123, respectively. Applications 122-123 can provide specialized processing (e.g., Layer 4 to Layer 7 services (e.g., firewall, Internet Protocol Security (IPsec), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)).

In one embodiment, network device 101 includes control cards 110-111. Control cards 110-111 include one or more processors to execute instructions stored in memory for performing/hosting applications 120-121. Applications 120-121 can provide specialized processing, such as signaling, routing (including, for example, creating of and/or management of routing tables), connection setup, session setup, etc. The line cards, service cards, control cards, and their respective applications are shown for illustrative purposes, and not intended to be limitations of the present invention. One having ordinary skill in the art would recognize that more or less cards of the same or different types can be implemented as part of network device 101. Further, more or less applications can be hosted on network device 101 than those shown in FIG. 1.

In the illustrated embodiment, ICR system 100 is communicatively coupled to network device 103, which can be a router, switch, etc. Network device 103 can be communicatively coupled to various subscriber end stations (not shown), which can be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc.

ICR system 100 helps to prevent, or at least reduce, service outages and/or loss of network traffic when various different types of failure events occur (e.g., software process crashes and/or failure of one or more backed up hardware resources within the chassis of network devices 101-102). The resilience and/or the switchover of active roles between network devices 101 and 102 can be transparent to the subscriber end stations. The subscriber end stations may not be aware, or not need to be aware, that they are connecting to a different network device when a switchover event occurs.

In one embodiment, ICR system 100 is able to perform switchovers transparently to the subscriber end stations by ensuring that network devices 101-102 are constantly syncing with each other. Here, syncing refers to network devices 101-102 passing their state information to each other, e.g., as part of ICR messages 131-132 over transport channel 130. The state information includes, but not limited to, state information of the network devices themselves (e.g., information indicating whether the network device is serving as an active or standby ICR device, etc.). State information can also relate to state information of the various applications that are hosted at network devices 101-102. ICR messages 131-132 can be exchanged using various protocols such as Internet Protocol (IP), User Datagram Protocol (UDP), Transmission Control Protocol (TCP), and other packet transmission protocols known in the art.

According to one embodiment, the ICR messages exchanged between network devices 101 and 102 (e.g., ICR message 131) include Internet Protocol (IP) header 153, common header 154, authentication digest (herein referred to as AUTH-1) 151, authentication digest (herein referred to as AUTH-2) 152, application header 155, and application data 156. It shall be understood that other fields can be included as part of ICR messages 131-132 without departing from the broader scope and spirit of the present invention. Throughout the description, ICR messages 131-132 are described as having an IP header. One having ordinary skill in the art would recognize that other headers (e.g., Transmission Control Protocol (TCP), User Datagram Protocol (UDP) headers, etc.) can be used. The use of these fields shall become apparent through the discussion of various other figures below.

It is common for message headers (e.g., IP header 153 and common header 154) to contain values that are repeated in multiple ICR messages exchanged between two network devices. For example, when multiple ICR messages are exchanged, the target and source IP addresses may be repeated for each of the ICR messages exchanged between the two devices. Thus, an attacker monitoring the ICR messages may infer other fields in the messages based on the repetitive patterns of the headers. For example, if AUTH-1 151 is positioned between IP header 153 and common header 154, an attacker may be able to infer AUTH-1 151 by observing the repeated values of IP header 153 and common header 154. The present invention overcomes such a limitation by positioning authentication digests 151 and 152 such that they are contiguous in the ICR message. In this way, it is difficult for an attacker to infer the authentication digests.

In some embodiments, ICR system 100 represents a geographically distributed ICR system to provide geographical redundancy of session or network traffic data. Network devices 101 and 102 can reside at different geographical locations (e.g., locations at least several miles apart, different towns or cities, different states, different countries, etc.). Such a geographically distributed ICR system helps to prevent, or at least reduce, service outages and/or loss of network traffic, when geographically localized disruption of service occurs (e.g., due to catastrophic weather, local loss of power, or other geographically localized events occurring at one but typically not both geographical locations).

Conventionally, ICR messages exchanged between ICR devices are sent in the clear. In cases where the ICR devices are geographically distributed, the risk of unauthorized sniffing and/or tampering of the ICR messages increases. As used herein, "sniffing" a packet refers to the accessing ("viewing") of the contents of a message, and "tampering" refers to the manipulation (e.g., adding, deleting, and/or altering one or more bits) of the contents of a message. Embodiments of the present invention overcome these limitations by providing mechanisms for authenticating the ICR messages to determine whether the messages have been tampered with. In one embodiment, the ICR messages are also encrypted to prevent unauthorized sources from sniffing the messages.

According to one embodiment, in response to determining to transmit an ICR message to a peer ICR device (e.g., network device 102), an application (e.g., applications 120-123) generates an application header (e.g., application header 155) and application data (e.g., application data 156). In one embodiment, the application further generates an AUTH-2 (e.g., AUTH-2 152), which can be used by the receiving peer ICR device for performing a second level authentication of the received ICR message. According to one embodiment, the application generates an AUTH-2 based on a key, the application header, and the application data.

In one embodiment, network device 101 includes authenticator 116, which can be implemented as software, firmware, hardware, or any combination thereof. In response to receiving data from the application to be transmitted to the peer ICR device, authenticator 116 generates an IP header (e.g., IP header 153) and a common header (e.g., common header 154). In one embodiment, authenticator 116 further generates an AUTH-1 (e.g., AUTH-1 151), which can be used by the receiving peer ICR device for performing a first level authentication of the received ICR message. In one embodiment, authenticator 116 generates an AUTH-1 based on a key and the AUTH-2 generated by the application. In an alternate embodiment, authenticator 116 generates an AUTH-1 based on a key, the generated IP header (e.g., with the time-to-live (TTL) field set to 0), and the generated common header. Authenticator 116 transmits the ICR message that includes the authentication digests to the peer ICR device, e.g., via a line card, such as one of line cards 114-115.

According to one embodiment, in response to receiving an ICR message from a peer ICR device (e.g., network device 102) via a line card (e.g., one of line cards 114-115), authenticator 116 is configured to perform a first level authentication of the received ICR message. In such an embodiment, authenticator 116 generates an AUTH-1 based on a key and the AUTH-2 included in the received ICR message. Alternatively, authenticator 116 generates an AUTH-1 based on a key and the IP header (e.g., with the TTL set to 0) and common header included in the received ICR message. As part of the first level authentication process, authenticator 116 compares the generated AUTH-1 against the AUTH-1 included in the received ICR message. In response to determining the first level authentication of the received ICR message is successful, authenticator 116 passes the received ICR message to the intended recipient application (e.g., based on information of the common header included in the received ICR message). As used herein, a first level authentication is successful if the generated AUTH-1 and the received AUTH-1 match (or differ within a predetermined tolerable margin). The tolerable margin can be user-configurable.

In one embodiment, in response to receiving an ICR message originating from a peer ICR device, an application (e.g., one of applications 120-123) performs a second level authentication of the received ICR message. In such an embodiment, the application generates an AUTH-2 based on a key and the application header and application data included in the received ICR message, and compares the generated AUTH-2 against the AUTH-2 included in the received ICR message. In response to determining the second level authentication is successful, the application processes the ICR message based on information of the application header and application data contained therein. As used herein, a second level authentication is successful if the generated AUTH-2 and the received AUTH-2 match (or differ within a predetermined tolerable margin). The tolerable margin can be user-configurable.

In one embodiment, network device 101 includes encryptor/decryptor 117, which can be implemented as software, firmware, hardware, or any combination thereof. Encryptor/decryptor 117 is configured to encrypt the application data (e.g., application data 156) prior to transmitting it to the peer ICR device as part of an ICR message. In one embodiment, in response to receiving an ICR message from a peer ICR device, encryptor/decryptor 117 is also configured to decrypt the application data (e.g., application data 156) included as part of the received ICR message.

In one embodiment, network device 102 includes line cards, control cards, and service cards similar to those included as part of network device 101. The line cards, control cards, and service cards on network device 120 are configured to host applications similar to those hosted on network device 101. Further, network device 102 is configured to perform authentication and/or encryption/decryption operations, similar to those performed by authenticator 116 and encryptor/decryptor 117, respectively. For the sake of brevity, the operations of network 102 will not be further described.

Figure 2:
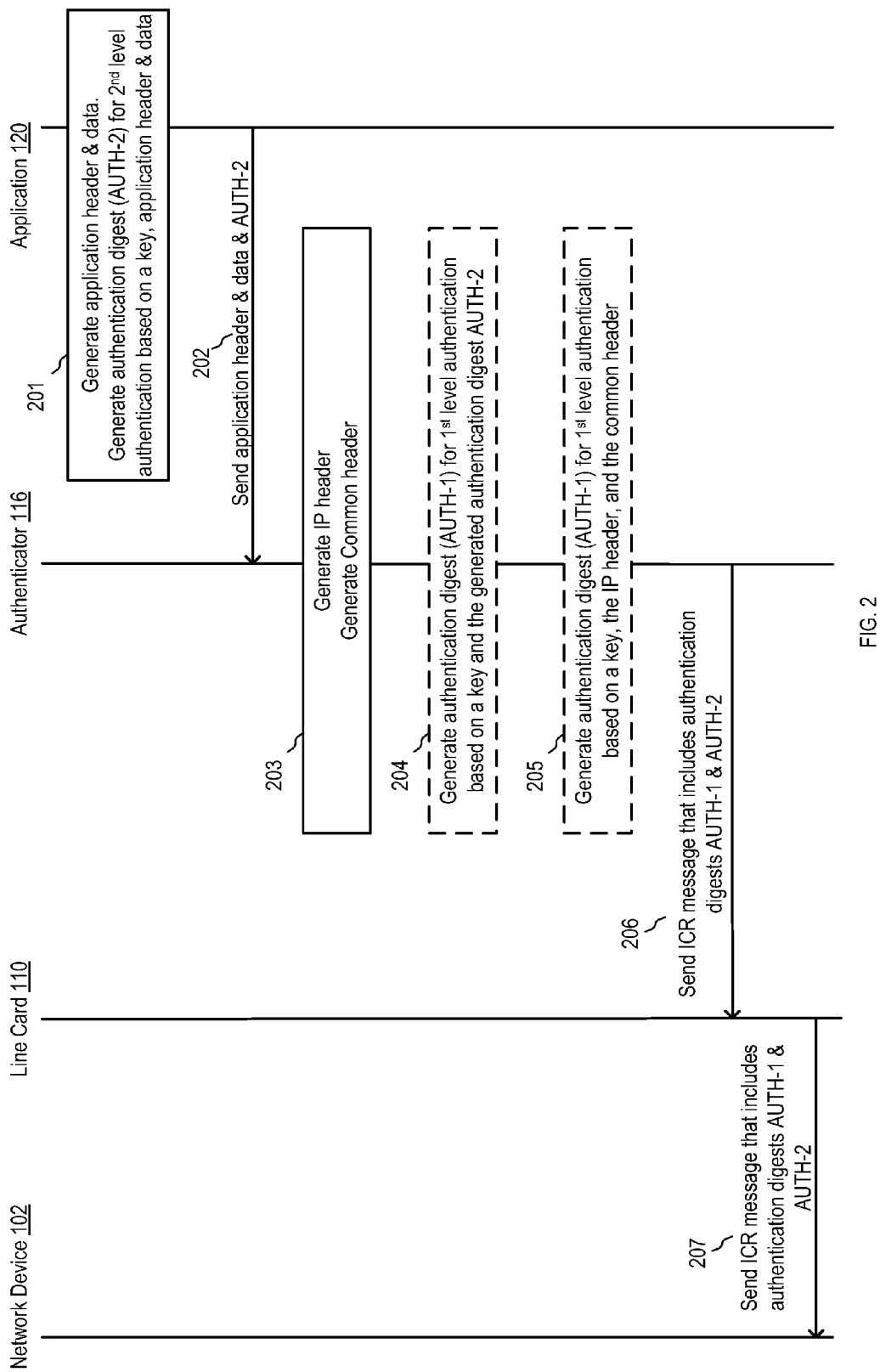
FIG. 2 is a transaction diagram illustrating a process flow for enabling two-level authentication of ICR messages according to one embodiment.

FIG. 2 is a transaction diagram illustrating a process flow for enabling two-level authentication of ICR messages according to one embodiment. FIG. 2 illustrates an ICR message originating from application 120 of control card 110. It shall be understood, however, that the ICR message may originate from any application (e.g., applications 120-123) hosted by any card (e.g., control cards 110-111, service cards 112-113, etc.) of network device 101. Accordingly, the transactions performed by application 120 can be performed by any of applications 120-123. Further, FIG. 2 illustrates that the ICR message is sent to a peer ICR device via line card 110. The ICR message can be sent, however, via other line cards of network device 101. It should be also understood that the ICR message may be sent to any peer ICR device, and not limited to network device 102.

Referring now to FIG. 2. At transaction 201, in response to determining to transmit application data to network device 102, application 120 generates the application header and application data. As part of transaction 201, application 120 further generates AUTH-2, which can be used by network device 102 for performing a second level authentication of the ICR message. In one embodiment, application 120 generates AUTH-2 based on a key, the application header, and the application data that are to be sent to network device 102. An embodiment for generating AUTH-2 is illustrated in FIG. 3.

Figure 3:
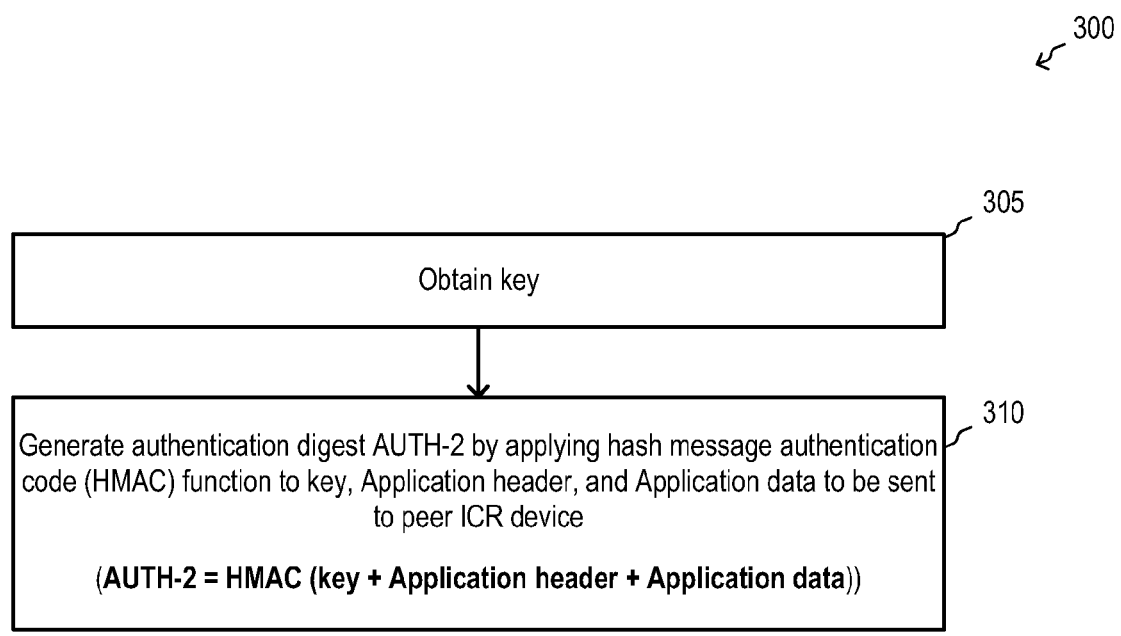
FIG. 3 is a flow diagram illustrating a method for generating an authentication digest according to one embodiment.

FIG. 3 is a flow diagram illustrating a method for generating an authentication digest according to one embodiment. For example, method 300 can be performed by an application hosted at network device 101 (e.g., applications 120-123), which can be implemented as software, firmware, hardware, or any combination thereof. For example, method 300 can be performed by application 120 as part of transaction 201. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Referring now to FIG. 3, at block 305, the application obtains a key. The key can be configured by a system operator (e.g., via an application programming interface (API)). Alternatively, the key may be dynamically generated by one or more of the ICR devices of ICR system 100. In such an embodiment, the keys can be distributed by the generating ICR device to other ICR devices, e.g., as part of ICR messages 131-132 via transport channel 130. Other mechanisms for distributing the keys, however, can be used.

At block 310, the application generates AUTH-2 by applying a function, such as a hash message authentication code (HMAC) function, to the key, the application header, and the application data that are to be sent to a peer ICR device. In cryptography, the HMAC function is utilized for calculating a message authentication code (MAC) involving a cryptographic hash function in combination with a secret cryptographic key. As with any MAC, it may be used to simultaneously verify both the data integrity and the authentication of a message. Any cryptographic hash function, such as MD5, SHA-1, SHA-2, etc., may be used in the calculation of an HMAC. The cryptographic strength of the HMAC depends upon the cryptographic strength of the underlying hash function, the size of its hash output, and on the size and quality of the key. The size of the output of HMAC is the same as that of the underlying hash function. For example, for an HMAC utilizing MD5 or SHA-1, the output is 128 bits or 160 bits, respectively. For an HMAC utilizing SHA-2, the output can be 224, 256, 384, or 512 bits. The HMAC output, however, can be truncated by using only a portion of the least significant bits (LSBs) or most significant bits (MSBs). In one embodiment, the AUTH-2 is derived by using the most significant 8 bytes of the HMAC output. Alternatively, the AUTH-2 can be derived by using the least significant 8 bytes of the HMAC output. Other truncated HMAC output sizes can be used.

Referring now back to FIG. 2, at transaction 202, application 120 sends the application header, application data, and generated AUTH-2 to authenticator 116. The application header may include information indicating which of the applications on network device 102 is intended to receive and process the application data. At transaction 203, authenticator 116 generates an IP header and a common header. The IP header can be an IP version 4 (IPv4) or IP version 6 (IPv6) header. The IP header includes information identifying the source (e.g., network device 101) and the target (e.g., network device 102). IP headers are well known in the art, and for the sake of brevity, they will not be elaborated here. In one embodiment, the common header includes information identifying the card for which the ICR message is intended at the receiving peer ICR device. For example, network device 102 may use the common header to determine which of the service cards or control cards the ICR message is intended for. At transaction 204, authenticator 116 may optionally generate an AUTH-1 based on a key and an AUTH-2 generated by the application (e.g., as part of transaction 201). An embodiment for generating AUTH-1 is illustrated in FIG. 4.

Figure 4:
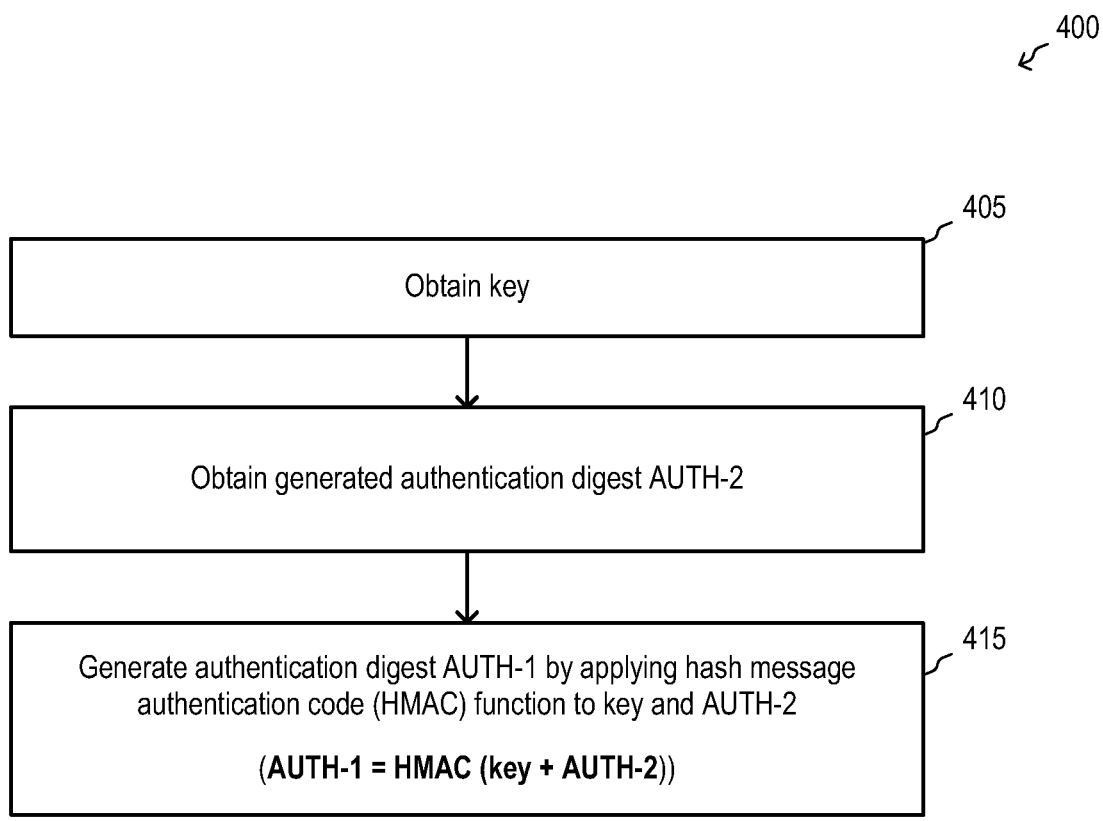
FIG. 4 is a flow diagram illustrating a method for generating an authentication digest according to one embodiment.

FIG. 4 is a flow diagram illustrating a method for generating an authentication digest according to one embodiment. For example, method 400 can be performed by authenticator 116 (e.g., as part of transaction 204), which can be implemented as software, firmware, hardware, or any combination thereof. Referring now to FIG. 4, at block 405, the authenticator obtains a key. The key can be configured by a system operator (e.g., via an API). Alternatively, the key may be dynamically generated by one or more of the ICR devices of ICR system 100. In such an embodiment, the keys can be distributed by the generating ICR device to other ICR devices, e.g., as part of ICR messages 131-132 via transport channel 130. Other mechanisms for distributing the keys, however, can be used.

At block 410, the authenticator obtains an AUTH-2 which was generated by an application based on a key and the application header and application data that are to be transmitted to a peer ICR device. For example, the AUTH-2 may be the AUTH-2 generated by application 120 as part of transaction 201. At block 415, the authenticator generates an AUTH-1 by applying a function, e.g., an HMAC function, to the key and the AUTH-2. Any cryptographic hash function, such as MD5, SHA-1, SHA-2, etc., may be used in the calculation of the HMAC. As described above, the size of the HMAC output varies, depending on the underlying hash function. The HMAC output, however, can be truncated by using only a portion of the LSBs or MSBs. In one embodiment, the AUTH-1 is derived by using the most significant 8 bytes of the HMAC output. Alternatively, the AUTH-1 can be derived by using the least significant 8 bytes of the HMAC output. Other truncated HMAC output sizes can be used.

Referring now back to FIG. 2. At transaction 205, authenticator 116 may optionally generate an AUTH-1 based on a key, the generated IP header, and the generated common header (e.g., as part of transaction 203). An embodiment for generating AUTH-1 is illustrated in FIG. 5.

Figure 5:
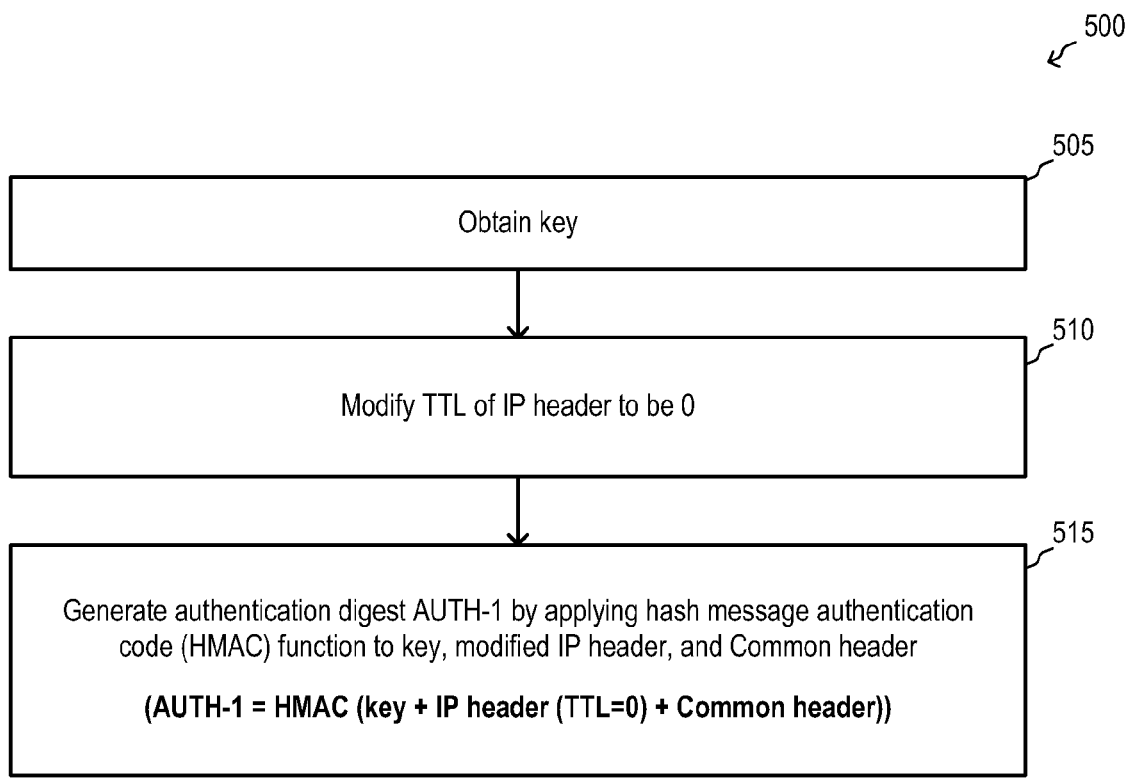
FIG. 5 is a flow diagram illustrating a method for generating an authentication digest according to one embodiment.

FIG. 5 is a flow diagram illustrating a method for generating an authentication digest according to one embodiment. For example, method 500 can be performed by authenticator 116 (e.g., as part of transaction 205), which can be implemented as software, firmware, hardware, or any combination thereof. Referring now to FIG. 5, at block 505, the authenticator obtains a key. The key can be configured by a system operator (e.g., via an API). Alternatively, the key may be dynamically generated by one or more of the ICR devices of ICR system 100. In such an embodiment, the keys can be distributed by the generating ICR device to other ICR devices, e.g., as part of ICR messages 131-132 via transport channel 130. Other mechanisms for distributing the keys, however, can be used.

At block 510, the authenticator modifies (e.g., sets to 0) the TTL of a local copy of the IP header that is to be transmitted to the peer ICR device (e.g., the IP header generated as part of transaction 203). It shall be understood that the TTL is modified only for the purpose of generating AUTH-1. The IP header that is transmitted to the peer ICR device remains unmodified. At block 515, the authenticator generates an AUTH-1 by applying a function, e.g., an HMAC function, to the key, the modified IP header, and a common header that is to be transmitted to the peer ICR device (e.g., the common header generated as part of transaction 203). Any cryptographic hash function, such as MD5, SHA-1, SHA-2, etc., may be used in the calculation of the HMAC. As described above, the size of the HMAC output varies, depending on the underlying hash function. The HMAC output, however, can be truncated by using only a portion of the LSBs or MSBs. In one embodiment, the AUTH-1 is derived by using the most significant 8 bytes of the HMAC output. Alternatively, the AUTH-1 can be derived by using the least significant 8 bytes of the HMAC output. Other truncated HMAC output sizes can be used.

Referring now back to FIG. 2. Transactions 204 and 205 are described as being optional because typically the AUTH-1 is generated using transaction 204 or transaction 205, but not both. It should be understood, however, that authenticator 116 may perform transaction 204 for one ICR message, while performing transaction 205 for another ICR message. The generation of AUTH-1 and AUTH-2 involve the use of a key. In one embodiment, the key used for generating AUTH-1 is different from the key used for generating AUTH-2. In an alternate embodiment, the keys are the same.

At transaction 206, authenticator 116 generates an ICR message that includes, for example, the application header, application data, AUTH-2, IP header, common header, and AUTH-1. As part of transaction 206, authenticator 116 sends the generated ICR message to line card 110, which sends it to the intended peer ICR device (in this example, network device 102) as part of transaction 207.

Figure 6:
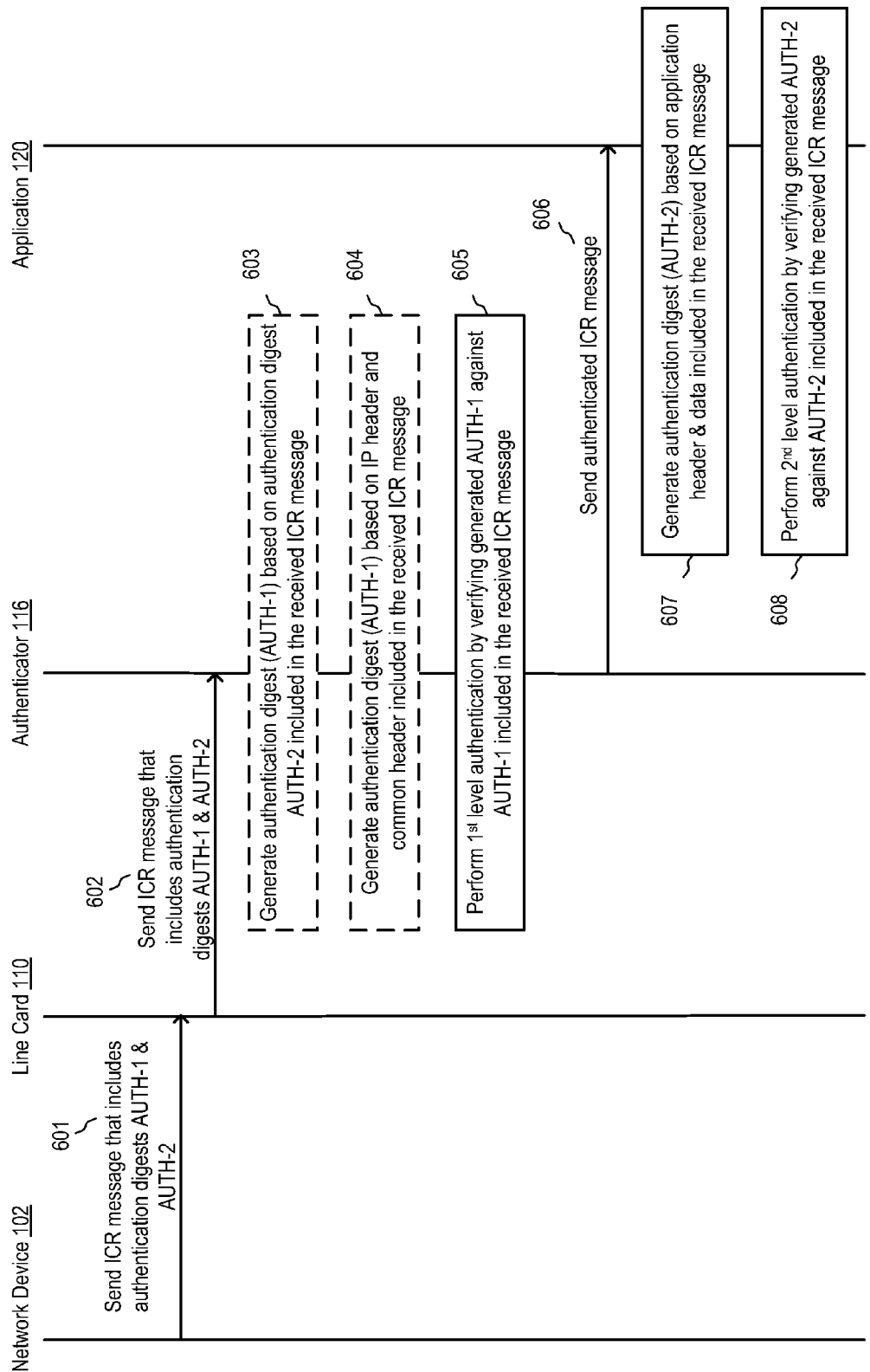
FIG. 6 is a transaction diagram illustrating a process flow for performing a two-level authentication of ICR messages according to one embodiment.

FIG. 6 is a transaction diagram illustrating a process flow for performing a two-level authentication of ICR messages according to one embodiment. FIG. 6 illustrates line card 110 receiving an ICR message originating from network device 102. It shall be understood, however, that the ICR message may originate from any peer ICR device, and that any line card (e.g., line cards 114-115) of network device 101 may receive the ICR message. FIG. 6 illustrates that the received ICR message is destined for application 120 of control card 110. It shall be understood, however, that the ICR message may be destined for any application (e.g., applications 120-123) hosted at network device 102. Accordingly, the transactions performed by application 120 can be performed by any of applications 120-123.

Referring now to FIG. 6. At transaction 601, network device 102 sends an ICR message to line card 110 destined for application 120. In one embodiment, the ICR message includes fields similar to those shown for ICR message 131. At transaction 602, line card 110 forwards the received ICR message to authenticator 116 for authentication. At transaction 603, authenticator 116 optionally generates an AUTH-1 based on the AUTH-2 included in the received ICR message. An embodiment for generating AUTH-1 is illustrated in FIG. 7.

Figure 7:
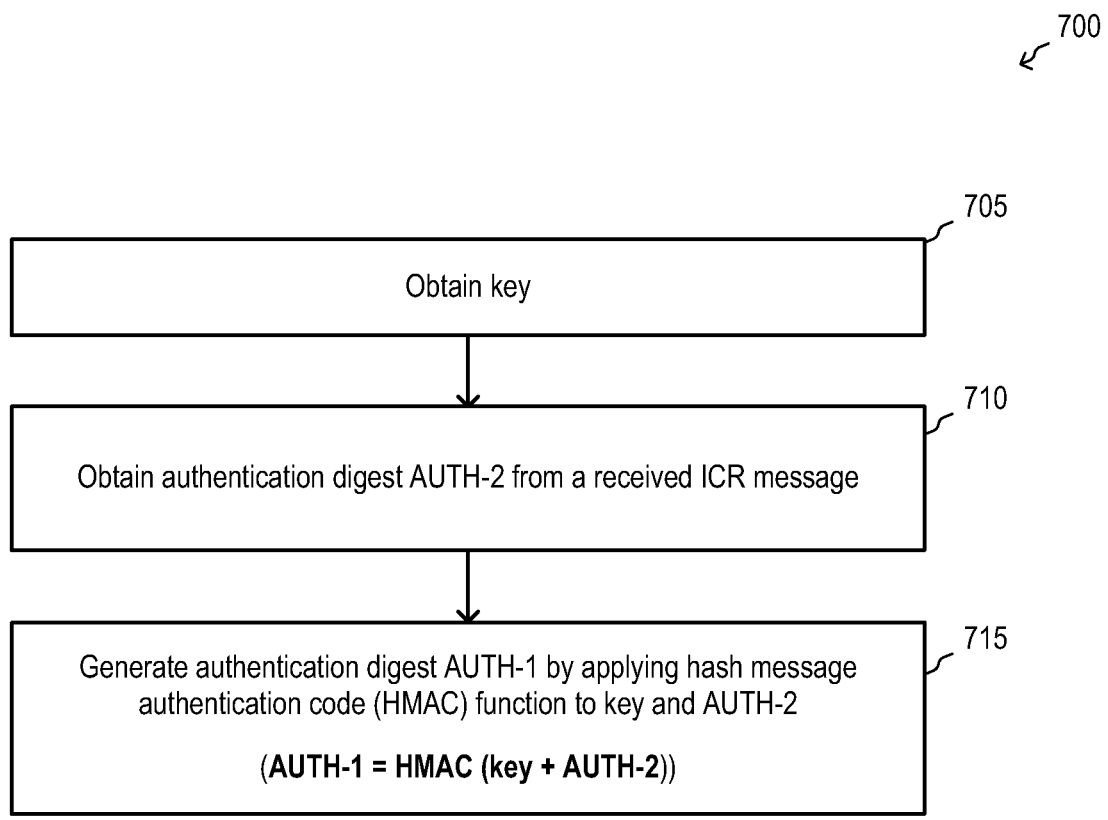
FIG. 7 is a flow diagram illustrating a method for generating an authentication digest according to one embodiment.

FIG. 7 is a flow diagram illustrating a method for generating an authentication digest according to one embodiment. For example, method 700 can be performed by authenticator 116 (e.g., as part of transaction 603), which can be implemented as software, firmware, hardware, or any combination thereof. Referring now to FIG. 7, at block 705, the authenticator obtains a key. The key can be configured by a system operator (e.g., via an API). Alternatively, the key may be dynamically generated by one or more of the ICR devices of ICR system 100. In such an embodiment, the keys can be distributed by the generating ICR device to other ICR devices, e.g., as part of ICR messages 131-132 via transport channel 130. Other mechanisms for distributing the keys, however, can be used.

At block 710, the authenticator obtains an AUTH-2 which was included in the received ICR message. At block 715, the authenticator generates an AUTH-1 by applying a function, e.g., an HMAC function, to the key and the AUTH-2. Any cryptographic hash function, such as MD5, SHA-1, SHA-2, etc., may be used in the calculation of the HMAC. As described above, the size of the HMAC output varies, depending on the underlying hash function. The HMAC output, however, can be truncated by using only a portion of the LSBs or MSBs. In one embodiment, the AUTH-1 is derived by using the most significant 8 bytes of the HMAC output. Alternatively, the AUTH-1 can be derived by using the least significant 8 bytes of the HMAC output. Other truncated HMAC output sizes can be used.

Referring now back to FIG. 6. At transaction 604, authenticator 116 optionally generates an AUTH-1 based on the IP header and common header included in the received ICR message. An embodiment for generating AUTH-1 is illustrated in FIG. 8.

Figure 8:
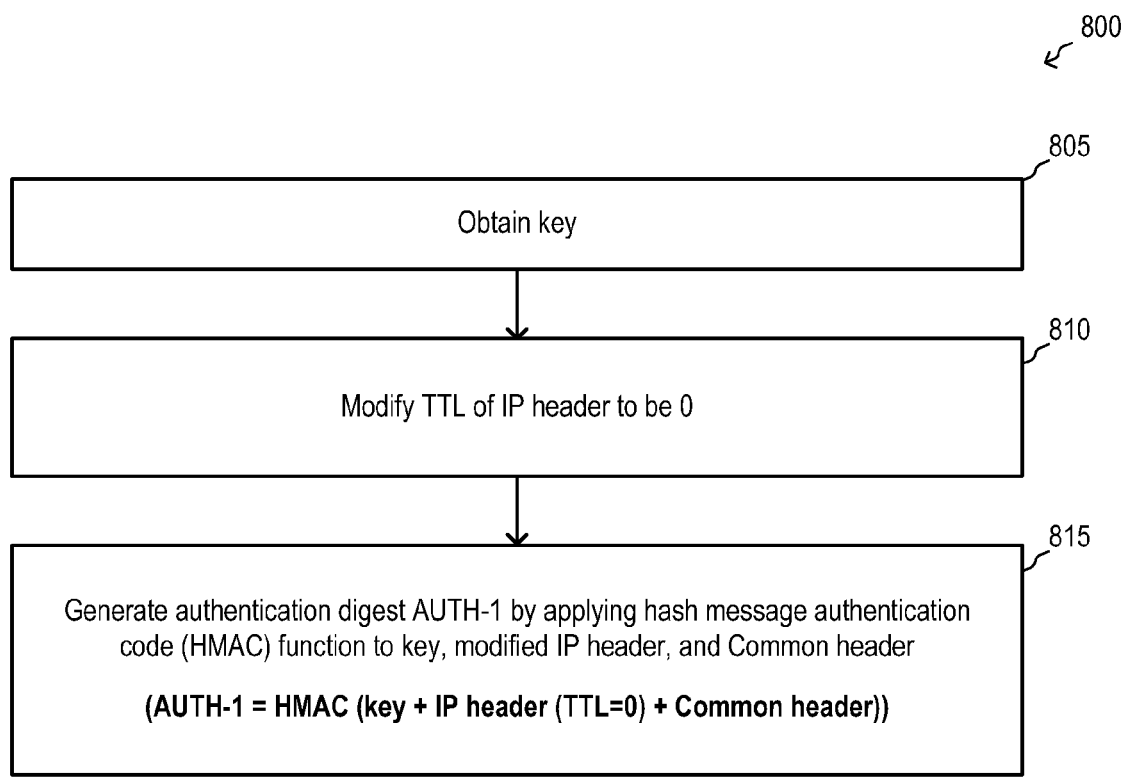
FIG. 8 is a flow diagram illustrating a method for generating an authentication digest according to one embodiment.

FIG. 8 is a flow diagram illustrating a method for generating an authentication digest according to one embodiment. For example, method 800 can be performed by authenticator 116 (e.g., as part of transaction 604), which can be implemented as software, firmware, hardware, or any combination thereof. Referring now to FIG. 8, at block 805, the authenticator obtains a key. The key can be configured by a system operator (e.g., via an API). Alternatively, the key may be dynamically generated by one or more of the ICR devices of ICR system 100. In such an embodiment, the keys can be distributed by the generating ICR device to other ICR devices, e.g., as part of ICR messages 131-132 via transport channel 130. Other mechanisms for distributing the keys, however, can be used.

At block 810, the authenticator modifies (e.g., sets to 0) the TTL of a local copy of the IP header that is included in the received ICR message. It shall be understood that the TTL is modified only for the purpose of generating the AUTH-1. The IP header that is sent to the intended application remains unmodified. At block 815, the authenticator generates an AUTH-1 by applying a function, e.g., an HMAC function, to the key, the modified IP header, and the common header that is included in the received ICR message. Any cryptographic hash function, such as MD5, SHA-1, SHA-2, etc., may be used in the calculation of the HMAC. As described above, the size of the HMAC output varies, depending on the underlying hash function. The HMAC output, however, can be truncated by using only a portion of the LSBs or MSBs. In one embodiment, the AUTH-1 is derived by using the most significant 8 bytes of the HMAC output. Alternatively, the AUTH-1 can be derived by using the least significant 8 bytes of the HMAC output. Other truncated HMAC output sizes can be used.

Referring now back to FIG. 6. Transactions 603 and 604 are described as being optional because typically the AUTH-1 is generated using transaction 603 or transaction 604, but not both. It should be understood, however, that authenticator 116 may perform transaction 603 for one received ICR message, while performing transaction 604 for another received ICR message. The generation of AUTH-1 and AUTH-2 involve the use of a key. In one embodiment, the key used for generating AUTH-1 is different from the key used for generating AUTH-2. In an alternate embodiment, the keys are the same.

At transaction 605, authenticator 116 performs a first level authentication of the received ICR message by comparing the generated AUTH-1 against the received AUTH-1. In one embodiment, the first level authentication of the received ICR message is determined to be successful if the generated AUTH-1 and received AUTH-1 match (or differ within a predetermined tolerable margin). The tolerable margin can be user-configurable.

At transaction 606, based on information included in the received common header, authenticator 116 determines (either directly or indirectly through line card 110) that the received ICR message is destined/intended for application 120. Accordingly, authenticator 116, in response to determining that the first level authentication is successful, sends the received ICR message to application 120. At transaction 607, application 120 generates an AUTH-2 based on the received application header and received application data. An embodiment for generating AUTH-2 is illustrated in FIG. 9.

Figure 9:
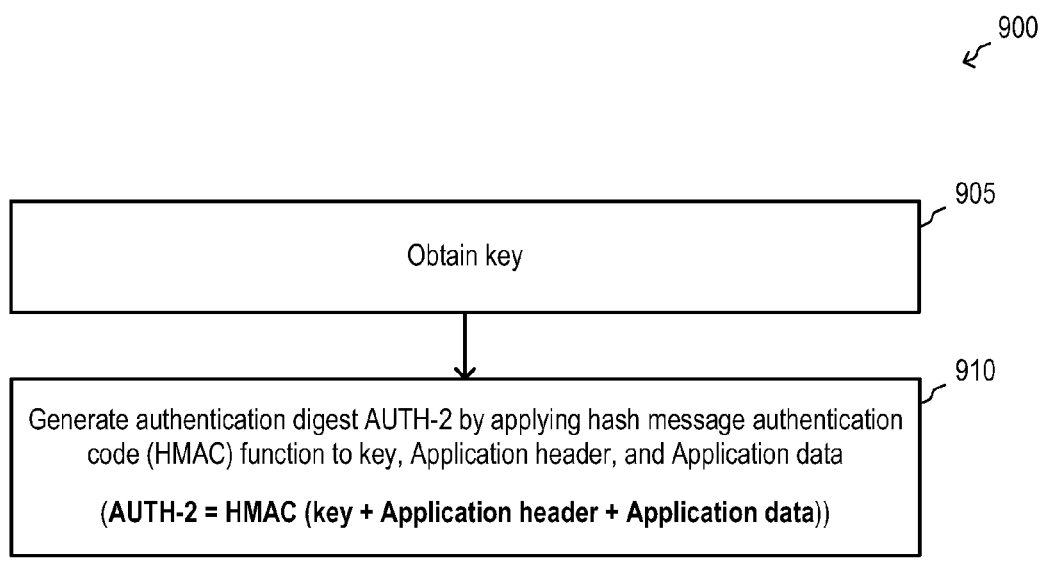
FIG. 9 is a flow diagram illustrating a method for generating an authentication digest according to one embodiment.

FIG. 9 is a flow diagram illustrating a method for generating an authentication digest according to one embodiment. For example, method 900 can be performed by an application hosted at network device 101 (e.g., applications 120-123), which can be implemented as software, firmware, hardware, or any combination thereof. For example, method 900 can be performed by application 120 as part of transaction 607.

Referring now to FIG. 9, at block 905, the application obtains a key. The key can be configured by a system operator (e.g., via an application programming interface (API)). Alternatively, the key may be dynamically generated by one or more of the ICR devices of ICR system 100. In such an embodiment, the keys can be distributed by the generating ICR device to other ICR devices, e.g., as part of ICR messages 131-132 via transport channel 130. Other mechanisms for distributing the keys, however, can be used.

At block 910, the application generates an AUTH-2 by applying a function, such as a hash message authentication code (HMAC) function, to the key, the received application header, and the received application data. Any cryptographic hash function, such as MD5, SHA-1, SHA-2, etc., may be used in the calculation of the HMAC. As described above, the size of the HMAC output varies, depending on the underlying hash function. The HMAC output, however, can be truncated by using only a portion of the LSBs or MSBs. In one embodiment, the AUTH-2 is derived by using the most significant 8 bytes of the HMAC output. Alternatively, the AUTH-2 can be derived by using the least significant 8 bytes of the HMAC output. Other truncated HMAC output sizes can be used.

Referring now back to FIG. 6. At transaction 608, application 120 performs a second level authentication of the received ICR message by comparing the generated AUTH-2 against the received AUTH-2. In one embodiment, the second level authentication of the received ICR message is determined to be successful if the generated AUTH-2 and received AUTH-2 match (or differ within a predetermined tolerable margin). The tolerable margin can be user-configurable. According to one embodiment, in response to determining that the second level authentication of the received ICR message is successful, application 120 processes the received ICR message. Otherwise, the received ICR message is dropped/discarded.

According to some embodiments, in order to prevent (or at least minimize the risk of) the ICR messages from being sniffed by unauthorized sources, a source ICR device encrypts the application data (e.g., application data 156) prior to transmitting the ICR message to a target ICR device. For example, a source application (e.g., application 120) may cause encryptor/decryptor 117 to encrypt the application data prior to generating the AUTH-2, and prior to sending the application data to authenticator 116. At the target ICR device, after the ICR message has been authenticated, the intended recipient application decrypts the application data prior to processing it.

In one embodiment, encryptor/decryptor 117 encrypts application data using a symmetric encryption algorithm. In such an embodiment, the encryption/decryption keys can be shared by the applications that are hosted on the ICR devices. For example, the keys can be transmitted as part of ICR messages 131-132 via transport channel 130. Other mechanism for sharing the keys, however, can be used.

According to one embodiment, encryption of application data can be selectively performed. In other words, application data of some ICR messages may be encrypted, while application data of other ICR messages may not be encrypted. In such an embodiment, information indicating whether the application data is encrypted can be included as part of the corresponding application header.

In cryptography, a mode of operation is an algorithm that uses a block cipher to provide an information service such as confidentiality or authenticity. Modes of operation include, for example, electronic codebook (ECB), cipher-block chaining (CBC), propagating cipher-block chaining (PCBC), cipher feedback (CFB), output feedback (OFB), etc. A block cipher by itself is only suitable for the secure cryptographic transformation (encryption or decryption) of one fixed-length group of bits called a block. A mode of operation describes how to repeatedly apply a cipher's single-block operation to securely transform amounts of data larger than a block.

Some modes of operation require a unique binary sequence, often called an initialization vector (IV), for each encryption operation. The IV has to be non-repeating and for some modes, random as well. The IV is used to ensure distinct ciphertexts are produced even when the same plaintext is encrypted multiple times independently with the same key. Block ciphers have one or more block size(s), but during transformation the block size is always fixed. Block cipher modes operate on whole blocks and require that the last part of the data be padded to a full block if it is smaller than the current block size. There are, however, modes that do not require padding because they effectively use a block cipher as a stream cipher.

Figure 10:
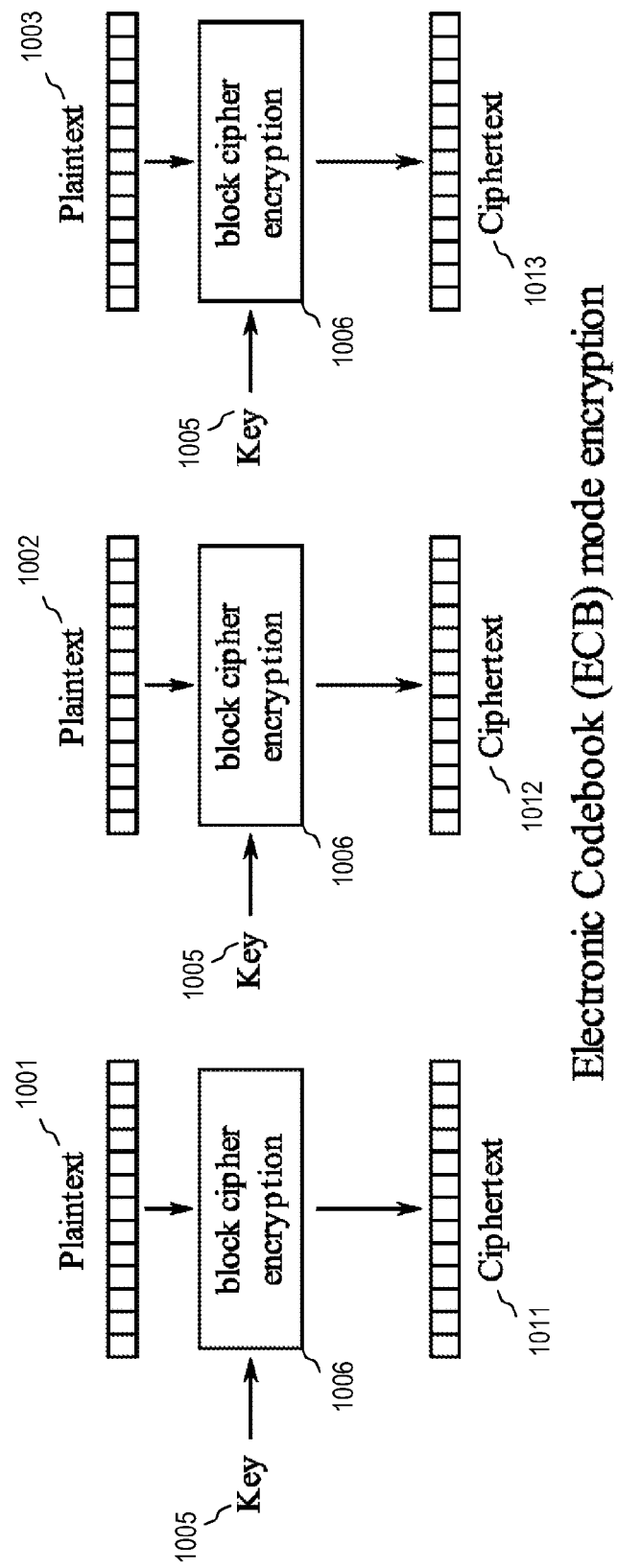
FIG. 10 is a block diagram illustrating a mode of encryption according to one embodiment.

FIG. 10 is a block diagram illustrating a mode of encryption according to one embodiment. For example, the illustrated ECB mode of operation can be performed by encryptor/decryptor 117, which can be implemented in software, firmware, hardware, or any combination thereof. As illustrated in FIG. 10, the application data may be partitioned into blocks of data (shown as plaintext 1001-1003). Block cipher encryption 1006 is applied to each plaintext 1001-1003 and key 1005 to produce corresponding ciphertext 1011-1013. Ciphertext 1011-1013 together make up the encrypted application data that is transmitted to the target ICR device.

Figure 11:
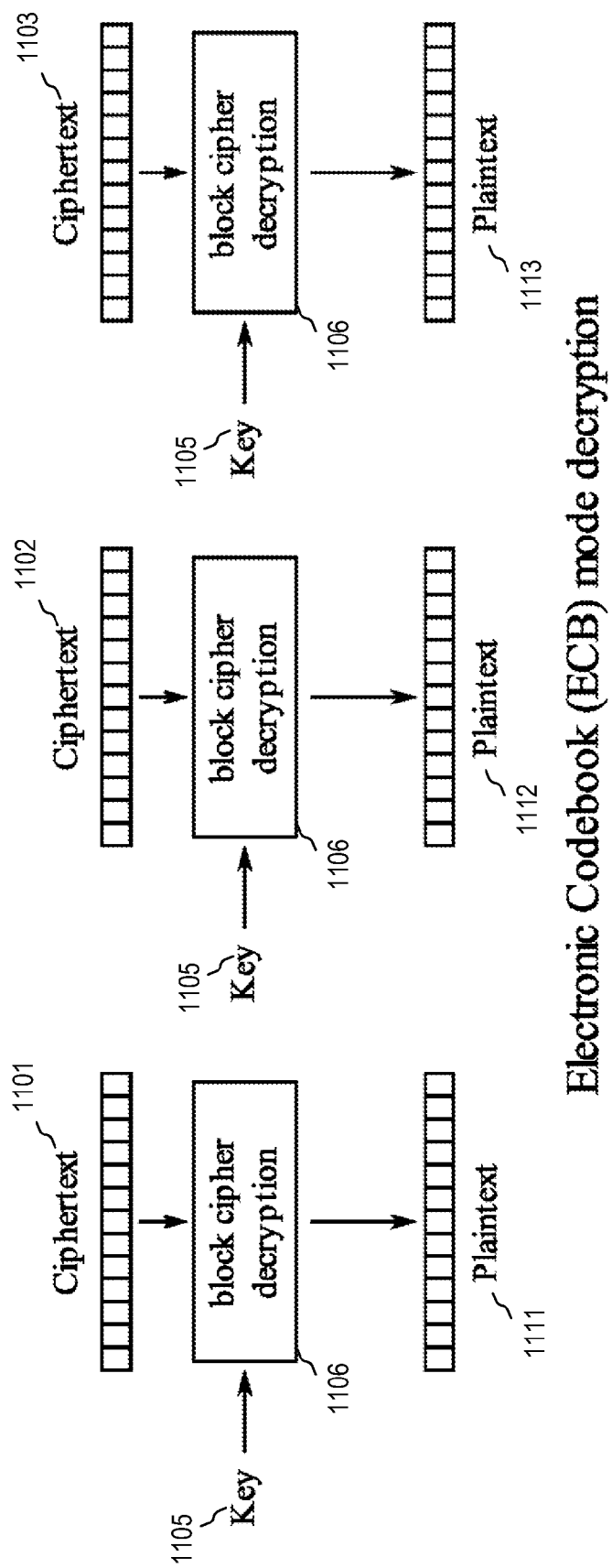
FIG. 11 is a block diagram illustrating a mode of decryption according to one embodiment.

FIG. 11 is a block diagram illustrating a mode of encryption according to one embodiment. For example, the illustrated ECB mode of operation can be performed by encryptor/decryptor 117, which can be implemented in software, firmware, hardware, or any combination thereof. As illustrated, the encrypted application data is partitioned into blocks of data (shown as ciphertext 1101-1103). Block cipher decryption 1106 is applied to each ciphertext 1101-1103 and key 1105 to produce corresponding plaintext 1111-1113. Plaintext 1111-1113 together make up the decrypted application data that is processed by the target application.

The ECB mode of encryption and decryption have been described for illustrative purposes, and not intended to be limitations of the present invention. One having ordinary skill in the art would recognize that other modes of encryption and decryption can be performed by encryptor/decryptor 117.

Conventionally, Internet Protocol Security (IPsec) protocol can be utilized to provide security to transmitted data. IPsec, however, has its disadvantages. For example, IPsec works only if the data is transmitted using the IP protocol. Embodiments of the present encryption/decryption can be applied to any link layer, Internet layer, and Internetwork Packet Exchange (IPX). Thus, embodiments of the present encryption/decryption mechanisms are more generic and are independent of the underlying transport mechanism. IPsec only has a single level of authentication of IP packets. Embodiments of the present encryption/decryption mechanisms can be implemented with multiple (for example, 2) levels of authentication, thus, providing a stronger approach. IPsec is available in different packages. For example, in a first package IPsec only has authentication using Authentication Header (AH) protocol, which does not provide privacy. In a second package, IPsec can provide privacy by using the Encapsulating Security Payload (ESP) protocol, wherein the Integrity Check Value (ICV) field in the ESP header is optional. In a third package, IPsec provides authentication and privacy by using the AH and ESP protocol. IPsec fails to provide, however, a package wherein authentication is provided, and privacy is optional. Embodiments of the present invention provide a 2-level authentication as a baseline, plus an optional privacy mode (i.e., encryptor/decryptor 117 can be optionally invoked). IPsec is central processing unit (CPU) intensive. The encryption/decryption mechanism of the present invention is light weight. Further, in IPsec the authentication digest included in the AH or ESP header has a fixed size, thus, rendering the digest more susceptible to being "guessed" by an attacker through brute force. On the contrary, the AUTH-1 and AUTH-2 of the present invention can vary in size. Further, by positioning AUTH-1 and AUTH-2 next to each other in an ICR message, embodiments of the present invention make it much more difficult for an attacker to "guess" where the AUTH-1 or AUTH-2 starts, and what the size of each digest is.

In the case of IPsec, the end user is provided with the benefits of authentication as defined by the Internet Key Exchange (IKE) policy. The present invention, however, allows authentication to be performed in a distributed manner (e.g., the first level of authentication is performed by authenticator 116 and the second level of authentication is performed by a corresponding application).

In the case of IPsec, the keying material is dynamically generated using IKE/IKEv2 protocol whenever the IPsec tunnel is established. In the present invention, there is no explicit peer entity involved for key generation. In the case of IPsec, when an application is restarted, IPsec tunnel must be re-established, which involves the intensive process of IKE negotiation. On the contrary, in the present invention, when an application is restarted, re-negotiation is not necessary.

Figure 12:
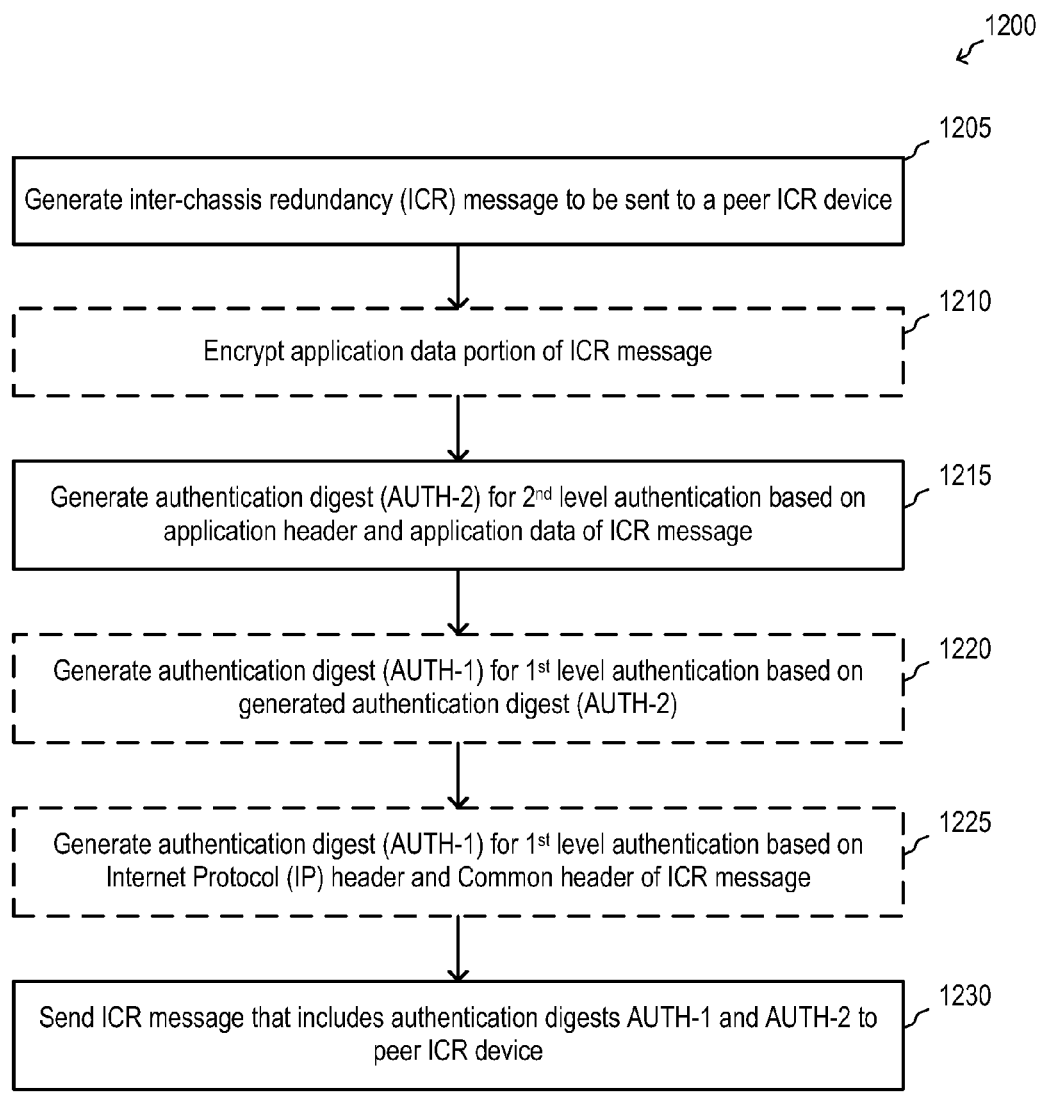
FIG. 12 is a flow diagram illustrating a method for enabling two-level authentication of ICR messages according to one embodiment.

FIG. 12 is a flow diagram illustrating a method for enabling authentication of ICR messages according to one embodiment. For example, method 1200 can be performed by network device 101, which can be implemented in software, firmware, hardware, or any combination thereof. Referring now to FIG. 12, at block 1205, the network device generates an ICR message to be sent to a peer ICR device (e.g., as part of transaction 201).

At block 1210, the network device optionally encrypts the application data portion of the generated ICR message. For example, as part of transaction 201, application 120 invokes encryptor/decryptor 117 to perform encryption of the generated application data. At block 1215, the network device generates AUTH-2 based on the application header and application data of the generated ICR message (e.g., as part of transaction 201). In one embodiment, the AUTH-2 is used by the receiving peer ICR device to perform a second level authentication of the ICR message.

At block 1220, the network device optionally generates an AUTH-1 based on the generated AUTH-2 (e.g., as part of transaction 204). At block 1225, the network device optionally generates AUTH-1 based on the IP header and common header of the generated ICR message (e.g., as part of transaction 205). In one embodiment, the AUTH-1 is used by the receiving peer ICR device to perform a first level authentication of the ICR message.

At block 1230, the network device sends the ICR message that includes at least the AUTH-1 and AUTH-2 to the peer ICR device (e.g., as part of transactions 206-207).

Figure 13:
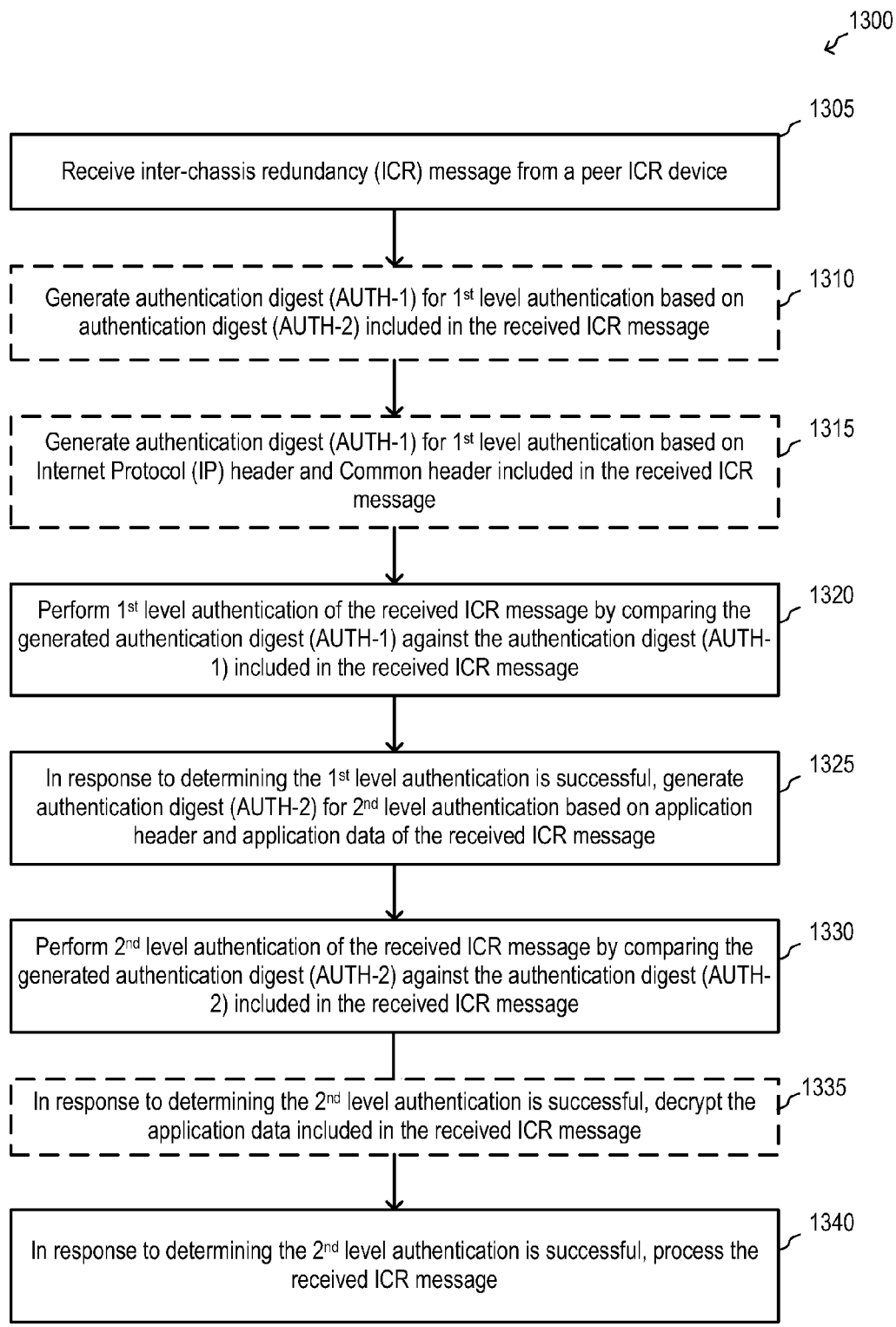
FIG. 13 is a flow diagram illustrating a method for performing a two-level authentication of ICR messages according to one embodiment.

FIG. 13 is a flow diagram illustrating a method for performing authentication of ICR messages according to one embodiment. For example, method 1300 can be performed by network device 101, which can be implemented in software, firmware, hardware, or any combination thereof. Referring now to FIG. 13, at block 1305, the network device receives an ICR message from a peer ICR device (e.g., as part of transaction 601). At block 1310, the network device optionally generates an AUTH-1 based on the AUTH-2 included in the received ICR message (e.g., as part of transaction 603). At block 1315, the network device optionally generates an AUTH-1 based on the IP header and common header included in the received ICR message (e.g., as part of transaction 604).

At block 1320, the network device performs a first level authentication of the received ICR message, for example, by comparing the generated AUTH-1 against the AUTH-1 included in the received ICR message (e.g., as part of transaction 605). In one embodiment, the first level authentication is determined to be successful if the generated AUTH-1 and the received AUTH-1 match (or differ within a predetermined tolerable margin).

At block 1325, in response to determining the first level authentication is successful, the network device generates an AUTH-2 based on the application header and application data included in the received ICR message (e.g., as part of transaction 607). At block 1330, the network device performs a second level authentication of the received ICR message, for example, by comparing the generated AUTH-2 against the received AUTH-2 (e.g., as part of transaction 608). In one embodiment, the second level authentication is determined to be successful if the generated AUTH-2 and the received AUTH-2 match (or differ within a predetermined tolerable margin).

At block 1335, in response to determining the second level authentication is successful, the network device optionally performs decryption of the received application data. For example, based on information in the received application header indicating the application data is encrypted, the network device invokes encryptor/decryptor 117 to perform decryption of the received application data. At block 1340, in response to determining the second level authentication is successful, the network device processes the (decrypted) application data.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device of an inter-chassis redundancy (ICR) system, the ICR system comprising the first network device communicatively coupled to a second network device of the ICR system, the method comprising:
    in response to determining to transmit an ICR message to the second network device, generating the ICR message by:
    generating an application header and application data,
    generating a first authentication digest based on the application header and the application data, wherein the first authentication digest is used by the second network device to perform a first level authentication of the ICR message,
    generating a second authentication digest based on an Internet Protocol (IP) header and a common header, wherein the second authentication digest is used by the second network device to perform a second level authentication of the ICR message, and
    including the first authentication digest and the second authentication digest in the ICR message;
    transmitting the ICR message that includes the first authentication digest, the second authentication digest, the application header, and the application data to the second network device;
    performing, by the second network device, the first level authentication by generating a third authentication digest and comparing the third authentication digest against the first authentication digest received in the ICR message; and
    if the first level authentication is successful, performing, by the second network device, the second level authentication by generating a fourth authentication digest and comparing the fourth authentication digest against the second authentication digest received in the ICR message.

2. The method of claim 1, wherein generating the first authentication digest comprises applying a hash-based message authentication code (HMAC) function to a key, the application header included in the ICR message, and the application data included in the ICR message.

3. The method of claim 1, wherein generating the second authentication digest comprises applying a hash-based message authentication code (HMAC) function to a key, the IP header included in the ICR message, and the common header included in the ICR message.

4. The method of claim 1, wherein generating the ICR message further comprises encrypting die application data of the ICR message, and wherein the transmitted ICR message includes the encrypted application data.

5. The method of claim 1, wherein the first authentication digest and the second authentication digest are contiguously located in the ICR message.

6. The method of claim 1, wherein the first authentication digest and the second authentication digest are different in size.

7. A first network device of an inter-chassis redundancy (ICR) system, the ICR system comprising the first network device communicatively coupled to a second network device of the ICR system, the first network device comprising:

a set of one or more processors; and
a non-transitory machine-readable storage medium containing instructions, which when executed by the set of one or more processors, cause the first network device to:
in response to determining to transmit an ICR message to the second network device:
generate an application header and application data,
generate a first authentication digest based on the application header and the application data, wherein the first authentication digest is used by the second network device to perform a first level authentication of the ICR message,
generate a second authentication digest based on an Internet Protocol (IP) header and a common header, wherein the second authentication digest is used by the second network device to perform a second level authentication of the ICR message, and include the first authentication digest and the second authentication digest in the ICR message; and
transmit the ICR message that includes the first authentication digest, the second authentication digest, the application header, and the application data to the second network device, wherein the second network device performs the first level authentication by generating a third authentication digest and comparing the third authentication digest against the first authentication digest received in the ICR message, and if the first level authentication is successful, the second network device performs the second level authentication by generating a fourth authentication digest and comparing the fourth authentication digest against the second authentication digest received in the ICR message.

8. The first network device of claim 7, wherein generating the first authentication digest comprises applying a hash-based message authentication code (HMAC) function to a key, the application header included in the ICR message, and the application data included in the ICR message.

9. The first network device of claim 7, wherein generating the second authentication digest comprises applying a hash-based message authentication code (HMAC) function to a key, the IP header included in the ICR message, and the common header included in the ICR message.

10. The first network device of claim 7, wherein generating the ICR message further comprises encrypting the application data of the ICR message, and wherein the transmitted ICR message includes the encrypted application data.

11. The first network device of claim 7, wherein the first authentication digest and the second authentication digest are contiguously located in the ICR message.

12. The first network device of claim 7, wherein the first authentication digest and the second authentication digest are different in size.

13. A non-transitory computer-readable medium having computer instructions stored therein, which when executed by a processor of a first network device of an inter-chassis redundancy (ICR) system, the ICR system comprising the first network device communicatively coupled to a second network device of the ICR system, cause the processor to perform operations comprising:
in response to determining to transmit an ICR message to the second network device, generating the ICR message by:
generating an application header and application data,
generating a first authentication digest based on the application header and the application data, wherein the first authentication digest is used by the second network device to perform a first level authentication of the ICR message,
generating a second authentication digest based on an Internet Protocol (IP) header and a common header, wherein the second authentication digest is used by the second network device to perform a second level authentication of the ICR message, and
including the first authentication digest and the second authentication digest in the ICR message;
transmitting the ICR message that includes the first authentication digest, the second authentication digest, the application header, and the application data to the second network device;
performing, by the second network device, the first level authentication by generating a third authentication digest and comparing the third authentication digest against the first authentication digest received in the ICR message; and
if the first level authentication is successful, performing, by the second network device, the second level authentication by generating a fourth authentication digest and comparing the fourth authentication digest against the second authentication digest received in the ICR message.

14. The non-transitory computer-readable medium of claim 13, wherein generating the first authentication digest comprises applying a hash-based message authentication code (HMAC) function to a key, the application header included in the ICR message, and the application data included in the ICR message.

15. The non-transitory computer-readable medium of claim 13, wherein generating the second authentication digest comprises applying a hash-based message authentication code (HMAC) function to a key, the IP header included in the ICR message, and the common header included in the ICR message.

16. The non-transitory computer-readable medium of claim 13, wherein generating the ICR message further comprises encrypting the application data of the ICR message, and wherein the transmitted ICR message includes the encrypted application data.

17. The non-transitory computer-readable medium of claim 13, wherein the first authentication digest and the second authentication digest are contiguously located in the ICR message.

18. The non-transitory computer-readable medium of claim 13, wherein the first authentication digest and the second authentication digest are different in size.

19. A method in a first network device of an inter-chassis redundancy (ICR) system, the ICR system comprising the first network device communicatively coupled to a second network device of the ICR system, the method comprising:
receiving an ICR message from the second network device;
performing a first level authentication of the received ICR message based on a first authentication digest included in the received ICR message, wherein the first level authentication uses an Internet Protocol (IP) header included in the received ICR message and a common header included in the received ICR message;
in response to determining the first level authentication is successful, performing a second level authentication of the received ICR message based on a second authentication digest included in the received ICR message, wherein the second level authentication uses an application header included in the received ICR message and application data in the received ICR message;

in response to determining the first level authentication is successful, processing the ICR message based on the application header and application data in the ICR message;

wherein performing the first level authentication comprises generating a third authentication digest and comparing the third authentication digest against the first authentication digest received in the ICR message; and wherein performing the second level authentication comprises generating a fourth authentication digest and comparing the fourth authentication digest against the second authentication digest received in the ICR message.

20. The method of claim 19, wherein performing the first level authentication of the received ICR message comprises:

generating the third authentication digest by applying a hash-based message authentication code (HMAC) function to a key, the IP header included in the received ICR message, and the common header included in the received ICR message; and comparing the generated third authentication digest against the first authentication digest included in the received ICR message, wherein the first level authentication of the ICR message is successful if the generated third authentication digest matches the first authentication digest included in the received ICR message.

21. The method of claim 19, wherein performing the second level authentication of the received ICR message comprises:

generating fourth authentication digest by applying a hash-based message authentication code (HMAC) function to a key, the application header included in the received ICR message, and the application data included in the received ICR message; and comparing the generated fourth authentication digest against the second authentication digest included in the received ICR message, wherein the second level authentication of the ICR message is successful if the generated fourth authentication digest matches the second authentication digest included in the received ICR message.

22. The method of claim 19, further comprising decrypting the application data included in the received ICR message.

23. The method of claim 19, wherein the first level authentication and the second level authentication of the received ICR message are performed in a distributed manner.

24. A first network device of an inter-chassis redundancy (ICR) system, the ICR system comprising the first network device communicatively coupled to a second network device of the ICR system, the first network device comprising:

a set of one or more processors; and a non-transitory machine-readable storage medium containing instructions, which when executed by the set of one or more processors, cause the first network device to receive an ICR message from the second network device;

perform a first level authentication of the received ICR message based on a first authentication digest included in the received ICR message, wherein the first level authentication uses an Internet Protocol (IP) header included in the received ICR message and a common header included in the received ICR message;

in response to determining the first level authentication is successful, perform a second level authentication of the received ICR message based on a second authentication digest included in the received ICR message, wherein the second level authentication uses an application header included in the received ICR message and application data in the received ICR message;

in response to determining the first level authentication is successful, processing the ICR message based on the application header and application data in the ICR message;

wherein performing the first level authentication comprises generating a third authentication digest and comparing the third authentication digest against the first authentication digest received in the ICR message; and wherein performing the second level authentication comprises generating a fourth authentication digest and comparing the fourth authentication digest against the second authentication digest received in the ICR message.

25. The first network device of claim 24, wherein performing the first level authentication of the received ICR message comprises:

generating the third authentication digest by applying a hash-based message authentication code (HMAC) function to a key, the IP header included in the received ICR message, and the common header included in the received ICR message; and comparing the generated third authentication digest against the first authentication digest included in the received ICR message, wherein the first level authentication of the ICR message is successful if the generated third authentication digest matches the first authentication digest included in the received ICR message.

26. The first network device of claim 24, wherein performing the second level authentication of the received ICR message comprises:

generating the fourth authentication digest by applying a hash-based message authentication code (HMAC) function to a key, the application header included in the received ICR message, and the application data included in the received ICR message; and comparing the generated fourth authentication digest against the second authentication digest included in the received ICR message, wherein the second level authentication of the ICR message is successful if the generated fourth authentication digest matches the second authentication digest included in the received ICR message.

27. The first network device of claim 24, wherein the instructions further cause the first network device to decrypt the application data included in the received ICR message.

28. The first network device of claim 24, wherein the first level authentication and the second level authentication of the received ICR message are performed in a distributed manner.

29. A non-transitory computer-readable medium having computer instructions stored therein, which when executed by a processor of a first network device of an inter-chassis redundancy (ICR) system, the ICR system comprising the first network device communicatively coupled to a second network device of the ICR system, cause the processor to perform operations comprising:

receiving an ICR message from the second network device;

performing a first level authentication of the received ICR message based on a first authentication digest included in the received ICR message, wherein the first level authentication uses an Internet Protocol (IP) header included in the received ICR message and a common header included in the received ICR message;

in response to determining the first level authentication is successful, performing a second level authentication of the received ICR message based on a second authentication digest included in the received ICR message, wherein the second level authentication uses an application header included in the received ICR message and application data in the received ICR message; and in response to determining the first level authentication is successful, processing the ICR message based on the application header and application data in the ICR message;

wherein performing the first level authentication comprises generating a third authentication digest and comparing the third authentication digest against the first authentication digest received in the ICR message; and wherein performing the second level authentication comprises generating a fourth authentication digest and comparing the fourth authentication digest against the second authentication digest received in the ICR message.

30. The non-transitory computer-readable medium of claim 29, wherein performing the first level authentication of the received ICR message comprises:

generating the third authentication digest by applying a hash-based message authentication code (HMAC) function to a key, the IP header included in the received ICR message, and the common header included in the received ICR message; and comparing the generated third authentication digest against the first authentication digest included in the received ICR message, wherein the first level authentication of the ICR message is successful if the generated third authentication digest matches the first authentication digest included in the received ICR message.

31. The non-transitory computer-readable medium of claim 29, wherein performing the second level authentication of the received ICR message comprises:

generating the fourth authentication digest by applying a hash-based message authentication code (HMAC) function to a key, an application header included in the received ICR message, and application data included in the received ICR message; and comparing the generated fourth authentication digest against the second authentication digest included in the received ICR message, wherein the second level authentication of the ICR message is successful if the generated fourth authentication digest matches the second authentication digest included in the received ICR message.

32. The non-transitory computer-readable medium of claim 29, further comprising decrypting the application data included in the received ICR message.

33. The non-transitory computer-readable medium of claim 29, wherein the first level authentication and the second level authentication of the received ICR message are performed in a distributed manner.

* * * * *

UNITED STATES PATENT AND TRADEMARK OFFICE
CERTIFICATE OF CORRECTION

PATENT NO. : 9,319,222 B2
APPLICATION NO. : 14/247518
DATED : April 19, 2016
INVENTOR(S) : Pal Page 1 of 1

It is certified that error appears in the above-identified patent and that said Letters Patent is hereby corrected as shown below:

In Column 20, Line 55, in Claim 4, delete "die" and insert -- the --, therefor.

Signed and Sealed this
Twenty-eighth Day of June, 2016

Michelle K. Lee
*Director of the United States Patent and Trademark Office*